March 11, 1958  J. C. McMULLEN  2,825,933
FIBER TREATING METHOD AND APPARATUS
Filed July 7, 1954
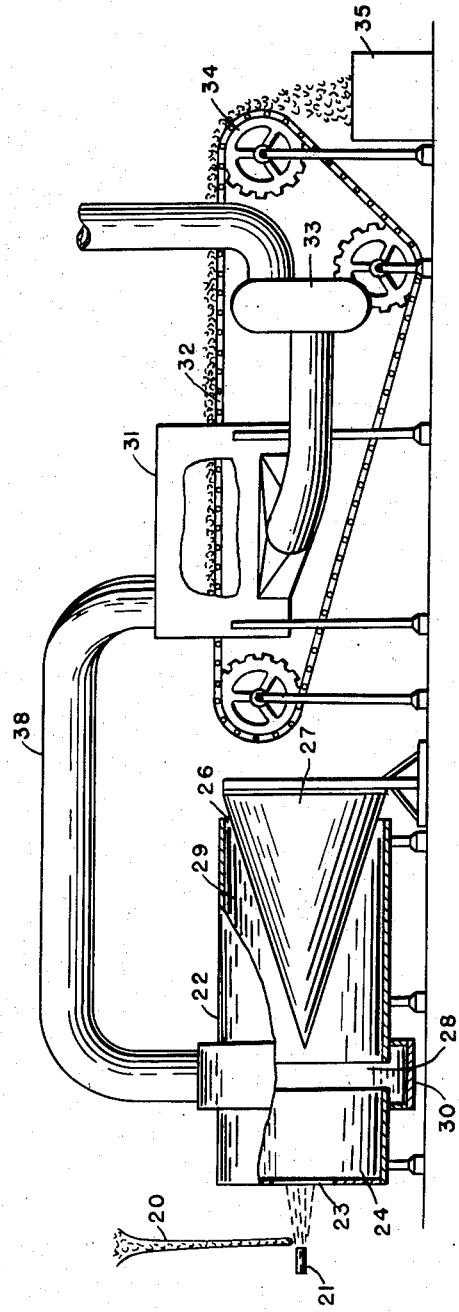
INVENTOR.
JOHN CHARLES McMULLEN
BY United States Patent Office 2,825,933
Patented Mar. 11, 1958

2,825,933

FIBER TREATING METHOD AND APPARATUS

John C. McMullen, Niagara Falls, N. Y., assignor to The Carborundum Company, Niagara Falls, N. Y., a corporation of Delaware Application July 7, 1954, Serial No. 441,917

4 Claims. (Cl. 19—72)

This invention relates to methods and apparatus for treating inorganic fibers. More specifically this invention relates to methods and apparatus for removing unfiberized material from inorganic fibers.

In the manufacture of inorganic fibrous material, such as slag wool, glass wool or mineral wool, a molten stream of the desired inorganic material is fiberized by various means, such as by impinging the molten stream on rapidly rotating discs or by impinging a high velocity blast of air or steam against the stream of inorganic material. Customarily the fibers, upon formation, are suspended in a gaseous medium, such as air where rotating discs or a blast of air are the fiberizing means, or steam where a blast of steam is the fiberizing means. The fibrous suspension is usually directed into a collecting chamber of some sort wherein the suspended fibrous material is removed from suspension to form a fibrous mass.

In the formation of inorganic fibers, such as by the aforementioned methods, customarily a substantial amount of unfiberized material, such as pellets, partially fiberized pellets and fiber bundles or slugs are formed. In many instances up to 50% and more of unfiberized material is formed during the manufacture of inorganic fibers. It is highly desirable to have an inorganic fibrous material having decreased amounts of unfiberized material.

Heretofore, numerous attempts have been made to provide apparatus and methods for the satisfactory separation of the fibers and unfiberized material produced in the manufacture of inorganic fibrous material. One such apparatus comprises an elongated horizontal chamber or tube into which a gaseous suspension of the products of fiberizing are blown. During movement of the gaseous suspension through the horizontal tube, it is intended that the light weight fibers remain in gaseous suspension while the heavier unfiberized material settles out on the bottom of the tube, thereby providing a separation between the fibers and the unfiberized material.

None of these prior art separating apparatus and methods have proven completely successful for various reasons. For example, in the separating systems that rely upon a settling of the unfiberized material from the gaseous stream, it has been found that inasmuch as the specific gravity of the unfiberized material is the same as the specific gravity of the fibers only a very limited separation is accomplished. The major part of the unfiberized material is either not deposited on the bottom of the separating chamber, or, if so deposited, it is subsequently entrained in the fast moving gaseous stream. As a result, the major part of the unfiberized material is present in the final treated product. Similarly the above-mentioned prior art apparatus and methods that rely solely upon a change in the course of the fast moving gaseous stream containing the product from the fiberizing operation have not been highly successful. Only poor separation initially is obtained, and in a very short time fibrous material builds up on the baffles to such an extent to make the apparatus completely unsatisfactory.

It is, therefore, an object of the present invention to provide improved apparatus and methods for treating inorganic fibrous material to remove unfiberized material therefrom.

These and other objects an advantages accruing from the practice of the present invention will become apparent as the description proceeds.

In accordance with the present invention inorganic fibers are treated to remove unfiberized material therefrom by the method which comprises introducing a fast moving gaseous stream containing fibers and unfiberized material into one end, the entrance end, of an elongated open ended confined chamber, the direction of movement of the gaseous stream being substantially parallel to the long dimension of the chamber and the cross sectional area of the introduced gaseous stream being substantially less than the internal cross sectional area of the chamber. Within the chamber the stream is mushroomed, or split, so that the direction of movement of the gaseous stream is changed 180°. This causes a substantial amount of the heavy unfiberized material, and particularly the fiber bundles, to be thrown out of the gaseous stream, thereby providing a fiber-rich gaseous stream. The unfiberized material that is thrown out of the gaseous stream continues its movement through the chamber substantially unobstructed by baffles or other structural members, but due to the streamlined design of the collection chamber is discharged therefrom through the exit end opposite the entrance end of the chamber at substantially the same speed and in a direction not more than 90° different, and preferably substantially the same as, the direction of the introduced stream. The fiber-rich gaseous stream is drawn back along the wall of the separating chamber in countercurrent relationship to the incoming stream and withdrawn by suction means from the chamber through an exhaust port through the wall of the chamber located toward the entrance end of the chamber forward of the exit of the chamber and also forward of the area where the direction of movement of the stream is changed through 180°. Usually the exhaust port is intermediate the entrance end of the chamber and the area where the direction of movement of the stream is changed through 180°.

In order to more clearly describe the methods and apparatus of the present invention, reference is made to the drawing which shows an elevation view of the preferred separating chamber of the present invention partly broken away to show the internal structure of the separating chamber and showing the collection chamber and suction means schematically.

Referring now to the drawing, the preferred apparatus of the present invention comprises a cylindrical separating chamber about 20' long and 8' in diameter, generally indicated by the reference numeral 22, comprising an entrance zone 24 about 6' long making up one end of the separating chamber having a centrally located circular entrance 23 to the separating chamber, and an unfiberized material exit zone 29 about 14' long making up the other end of the separating chamber opposite the entrance zone end. The end of the unfiberized material exit zone is open to provide an unfiberized material exit 26 from the separating chamber. In axial alignment across the exit or open end of the unfiberized material exit zone is baffle 27, which is tapered inwardly of the chamber substantially to a point and is conical in form with the apex angle from 20° to 45° pointed inwardly of the chamber. The apex angle is herein defined as the angle between the sides of the cone along a plane bisecting the cone. The baffle 27 is positioned across the open exit end of the cylindrical wall of the unfiberized material exit zone 29 in spaced relation to the chamber wall, about 2½" therefrom thereby providing an annular exit 26 of small area from the separating chamber. Intermediate the entrance zone 24 and the unfiberized material exit zone 29 there is an exhaust port 28 through the wall of the separating chamber 22. As shown, this exhaust port 28, which is in the form of an annular opening about 2½" wide, completely circumscribes the separating chamber and communicates with it throughout the circumference thereof.

Enclosing, connected to, and communicating with the exhaust port 28 there is an exhaust conduit 30, in the form of an annular duct, with a communicating duct 38 that leads to a collection chamber, generally indicated by the reference numeral 31. The cross sectional area of duct 38 is about the same as the area of the exhaust port 28. The collection chamber is completely enclosed from the atmosphere and has a blower 33 connected thereto. Within the chamber is a foraminous member, such as foraminous screen 32, which is positioned between the duct to the blower 33 and the entrance to the collection chamber from the duct 38. As shown the foraminous screen is in the form of an endless conveyor belt running on pulleys, or drums, 34. The foraminous screen and the collection chamber are therefore so constructed that gas entering the collection chamber from the exhaust conduit must pass through the foraminous screen to exit from the chamber to the blower.

In the practice of the method of the present invention, a molten stream 20 of fiberizable inorganic material, such as the composition disclosed in my United States Patent No. 2,557,834, is fiberized by fiberizing means 21, which as shown is a nozzle releasing a high velocity blast of gas such as air or steam. The fiberized product leaves the fiberizing area in the form of a fast moving gaseous suspension, or stream, comprising discrete fibers and unfiberized material.

The fast moving gaseous stream is directed into the separating chamber 22 through entrance 23, entering the chamber centrally thereof and in a substantially axial direction. The cross sectional area of the introduced gaseous stream is substantially less than the cross sectional area of the separating chamber, thereby facilitating optimum fiberizing. The fast moving gaseous stream containing fibers and unfiberized material moves centrally through the entrance zone 24 past the exhaust port 28 toward the unfiberized material exit zone 29.

As the fiber-containing stream approaches the conical baffle in the unfiberized material exit zone it is split, or mushroomed, so as to abruptly reverse its direction of movement through 180°. Upon reversal of the direction of movement of the fast moving stream, a substantial percentage of the heavier unfiberized material, and particularly the fiber bundles, is thrown out of the gaseous stream, thereby providing a fiber-rich gaseous stream. The unfiberized material that is thrown out of the gaseous stream is directed by the baffle 27 toward the exit 26, and continues to move in the same general direction and at the same approximate speed, that is without having its speed arrested or substantially decreased and without having its direction of movement at exit greatly changed with respect to the direction of the incoming stream. This unfiberized material is discharged from the separating chamber through the unfiberized material exit 26. Therefore the unfiberized material which is separated from the fibers is permitted to pass through the separating chamber and exit therefrom without having its speed arrested or its general direction of movement greatly changed. Under no conditions does the direction of the path of the exiting unfiberized material differ from the direction of the path of the incoming stream by more than about 90°.

Although the unfiberized material exit 26 presents a substantially unobstructed opening in the separating chamber substantially in line with the direction of movement of the introduced gaseous stream, very little if any fibrous material escapes from the separating chamber through this exit because of suction applied to the separating chamber through the exhaust port 28 located toward the entrance end of the separating chamber a substantial distance from the unfiberized material exit end. Sufficient suction is applied to the separating chamber by suction means 33 to make the drop in pressure across the exit 26 relatively small, thereby preventing substantial movement of gas therethrough. If the pressure drop is slightly positive, that is if the pressure within the chamber is slightly greater than the pressure outside, there will be a slight movement of fiber-carrying gas out through exit 26; or if the pressure drop is slightly negative, there will be a slight movement of gas from outside into the chamber. Both practices are advantageous for certain operations, depending upon the desired product. Maintaining the pressure drop slightly positive tends to give a fibrous product containing lesser amounts of unfiberized material, whereas maintaining the pressure drop slightly negative cuts down on the fiber loss through exit 26. Of course, if the pressure drop is too great either too much fiber is lost through this exit or unsatisfactory separation is caused by a large amount of air entering the chamber through this exit. The proper suction for the particular separation desired can be readily ascertained by varying the speed of the blower 33 and/or by varying the size of the unfiberized material exit 26. However, in general it can be said that the pressure drop across this exit should approach zero. Therefore blower 33 must have sufficient capacity to draw out of the separating chamber all gas that enters through the entrance 23.

Upon reversal of the direction of the gaseous stream adjacent the exit end of the separating chamber, the fiber-rich stream is drawn back along the wall of the chamber in counter-current relationship externally of the introduced stream in the form of an outer cylindrical or annular fiber-rich stream surrounding the incoming gaseous stream. The fiber-rich gaseous stream is withdrawn from the separating chamber through exhaust port 28, which directs the fiber-rich gaseous stream into the collection chamber 31.

Within the collection chamber the gaseous stream is intersected by the foraminous member 32, depositing the fibrous product comprising fibers and a minor or decreased amount of unfiberized material on the foraminous member and passing the gas stream, which may contain some unfiberized material of small particle size, therethrough to the suction means or blower 33. The foraminous member 32, being in the form of a moving conveyor, carries the deposited fibrous product out of the collection chamber and dumps it into any type of collecting bin 35.

The data in the following table typifies the practice of the preferred method of the present invention using the above-described preferred apparatus for treating blown fiber of the type disclosed in the above-mentioned McMullen patent and formed by a blast of 140 p. s. i. steam:

*Table*

| | |
|---|---|
| Amount of fiberized material blown into separating chamber | 800 #/hr. |
| Volume of gas drawn out of the separating chamber by the blower | 18,500 cu. ft./min. |
| Distance between cone baffle and separating chamber wall | 2½". |
| Amount of material discharged through unfiberized material exit | 50 #/hr. |
| Amount of fiberized product obtained off foraminous screen | 750 #/hr. |
| Pressure drop across unfiberized material exit | Approximately zero. |

The material discharged through the unfiberized material exit was extremely dense in texture, about 4 times as dense as the fibrous product. It contained a very high percentage of fiber bundles, or slugs, and a high percentage of pellets. This material was considered worthless as a product and was fed back into the melting furnace to be again melted and fiberized. In contrast, the fibrous product off the foraminous screen was light and fluffy in texture and contained practically no fiber slugs and a low percentage of pellets. This fibrous product was completely satisfactory for many uses without further treatment.

Although it is preferred that the relative sizes of the two zones of the separating chamber be approximately in the ratio of about 6:14, that is the unfiberized material exit zone being somewhat more than 2 times as long as the length of the entrance zone, the relative lengths of these zones can be changed considerably. However, it is preferred that the exhaust port be located relatively close to the entrance of the chamber. In fact the exhaust port can even be in or forward of the same plane as the entrance, some distance from and surrounding the entrance. It is also preferred that the apex of the baffle extend almost to the plane of the exhaust port. It is therefore apparent that the length of the unfiberized material exit zone is primarily determined by the length of the conical baffle.

Also the size of the fiber entrance and the unfiberized material exit can be varied substantially. However, the larger these openings, the more chance of excessive amounts of outside air entering the separating chamber. The entrance should be approximately equal in size to the cross-sectional area of the entering gas stream. The unfiberized material exit may be varied from about ½" to about 6" distance between the tapered baffle and the separating chamber wall.

Although for some operations it is not completely essential that the exhaust port extend completely around the separating chamber so as to draw gas from the full circference of the chamber, it has been found that this is highly desirable in all operations and in fact is essential for satisfactory operation in most instances. For example, apparatus such as that shown in the drawing but having the exhaust port extending around the chamber only about 300°, the bottom 60° of the chamber having no exhaust port and so no gas removal, functioned very poorly. After a very short period of operation fibrous material piled up on the bottom of the separating chamber in front of the entrance to such an extent as to interfere with the incoming gaseous stream. Therefore in the preferred form of the present invention the exhaust port extends completely around the separating chamber. Alternatively, a plurality of exhaust ports spaced about the circumference of the chamber with at least one at the bottom of the chamber gives relatively satisfactory results.

Certain other departures from the above-described apparatus of the preferred practice of the present invention are also satisfactory for carrying out the method of the present invention.

For example, although it is prefererd that the baffle 27 have an apex angle of about 20°–45°, such as 30°, some departure from this angle range is permissible. Relatively satisfactory results are obtained using a conical baffle with an apex angle from about 45°–60°, although not nearly as effective removal of unfiiberized material is obtained. Unsatisfactory separation is obtained when the baffle apex angle is greater than 60°. Likewise, baffles with apex angles somewhat less than 20° work satisfactorily although they require an excessively long separating chamber.

Similarly, the cross section of the separating chamber need not be circular, but instead can be a polygon such as a hexagon or a square, in which case the baffle at the exit end of the separating chamber preferably is pyramid in shape although it can be conical.

In another alternative apparatus, the unfiberized material exit zone of the separating chamber may be tapered in the form of a truncated cone with a large opening at the apex end of the cone walls, within which large apex opening is positioned the conical baffle forming the unfiberized material exit. However, this apparatus does not give as good a separation as where the unfiberized material exit zone is cylindrical. Similarly, the entrance zone can be tapered if desired.

Furthermore, it may be desirable to have a trap positioned in the bottom of the separating chamber either adjacent to or in the annular conduit surrounding the exhaust port. This trap would be opened periodically to remove any unfiberized material that gathers in this area.

The collecting chamber can take many forms other than that indicated. For example, the foraminous member instead of being in the form of an endless conveyor can be in the form of a drum to the inner side of which is applied suction.

While the present invention is illustrated as treating inorganic fibrous material produced by directing a blast of high velocity gas against a stream of molten material and finds its greatest utility in this application, the present invention is useful in the treatment of almost any kind of inorganic fibrous material containing substantial amounts of unfiberized particles, such as pellets, the prime requirement being that the inorganic fibrous material is capable of suspension in a fast moving gas stream of restricted area.

Having described the invention it is desired to claim:

1. Apparatus for treating inorganic fibers to remove unfiberized material therefrom comprising an elongated open-ended separating chamber having an entrance at one end thereof for receiving a moving gaseous suspension comprising fibers and unfiberized material, an exit at the other end through which unfiberized material leaves said chamber, a baffle positioned in spaced relationship across the exit end of said chamber, said baffle being tapered inwardly of said chamber substantially to a point, such as a conical or pyramid baffle, said baffle being positioned so as to provide an annular exit of small area from said chamber through which unfiberized material leaves said chamber, a substantially annular exhaust port in said chamber wall positioned intermediate of said entrance and unfiberized material exit ends of the chamber substantially completely surrounding and communicating with said separating chamber about its circumference whereby a gaseous suspension comprising fiber can be drawn from said separating chamber, and means for applying suction to said exhaust port whereby a gaseous stream comprising a suspension of fibers can be drawn from said separating chamber.

2. Apparatus for treating inorganic fibers to remove unfiberized material therefrom comprising an elongated open-ended separating chamber having an entrance at one end thereof for receiving a moving gaseous suspension comprising fibers and unfiberized material, said entrance being of smaller cross section area than the cross-sectional area of said separating chamber, a baffle positioned in spaced relationship with the walls of the other end of said chamber, said baffle being tapered, inwardly of the chamber substantially to a point, such as a conical or pyramid baffle, said baffle being positioned so as to provide a small annular exit from said chamber defined by said baffle and the walls of said chamber whereby unfiberized material can exit from said chamber, an annular exhaust port in said chamber wall positioned forward of the unfiberized material exit end of said chamber, and means for applying suction to said exhaust port whereby a fiber-rich gaseous stream can be drawn from said chamber.

3. Apparatus for treating inorganic fibers to remove unfiberized material therefrom comprising: an elongated cylindrical separating chamber comprising an entrance zone, one end of which has a small centrally positioned opening therethrough for receiving a moving gaseous suspension comprising fibers and unfiberized material, an unfiberized material exit zone connected to and communicating with the other end of said entrance zone, a conical baffle in spaced relationship with the end of the unfiberized material exit zone opposite the entrance to the chamber with the apex of the baffle inward of the chamber, said baffle being positioned so as to provide an annular exit of small area from said chamber whereby unfiberized material can exit from said chamber, said exit being defined by said baffle and the wall of the unfiberized material exit zone, and an annular exhaust port intermediate of said entrance and unfiberized material exit zones completely surrounding and communicating with said separating chamber throughout its circumference whereby a gaseous suspension comprising fibers can be drawn from said separating chamber; an exhaust conduit in communication with said exhaust port and terminating in a collection chamber whereby said suspension comprising fibers upon being drawn from said separating chamber enter said collection chamber; a foraminous screen within said collection chamber on which are deposited the fibers that enter the collecting chamber; and means for applying suction to said collection chamber and through said foraminous screen thereby applying suction through said exhaust conduit and exhaust port to said separating chamber whereby said suspension comprising fibers is drawn from the separating chamber into the collecting chamber and onto said foraminous screen.

4. The method of treating inorganic fibers to remove unfiberized material therefrom comprising introducing a fast moving gaseous stream containing fibers and unfiberized material into one end of an elongated confined chamber, the direction of movement of said gaseous stream being substantially parallel to the long dimension of said chamber and the cross-sectional area of said gaseous stream when introduced being substantially less than the cross-sectional area of said chamber, applying suctional force adjacent the entrance end of said chamber to the annular area in said chamber surrounding the area of the incoming fast moving fiber-laden stream to change the direction of movement of the gaseous stream 180° while said stream is within said chamber, said force being sufficient to act upon the fiber content of said stream and carry it with said main stream as it is reversed in direction, assisting the deflection of said gaseous stream from its original direction into said annular stream of countercurrent direction by impinging said incoming stream against a conical surface directed into the center of said incoming stream, withdrawing the unfiberized material from said stream along the sides of said conical surface in a direction less than 90° from the original direction of movement of said stream, and withdrawing the fiber-rich gaseous stream from said chamber at a location along the wall of said chamber intermediate of the entrance end of said chamber and the area where the direction of movement of the stream is changed through 180°.

References Cited in the file of this patent

UNITED STATES PATENTS

| | | |
|---|---|---|
| 773,180 | Anderson et al. | Oct. 25, 1904 |
| 1,002,131 | Broome | Aug. 29, 1911 |
| 1,340,063 | Lawrence | May 11, 1920 |
| 1,525,760 | Rushton | Feb. 10, 1925 |
| 1,927,817 | Allan | Sept. 26, 1933 |
| 2,153,739 | Buss | Apr. 11, 1939 |
| 2,403,740 | Muench | July 9, 1946 |